United States Patent Office 2,924,592
Patented Feb. 9, 1960

2,924,592

PROCESS FOR THE POLYMERIZATION OF ETHYLENE, CATALYTIC COMPOSITION THEREFOR, AND PROCESS OF PREPARATION THEREOF

Peter Fotis, Jr., Highland, Ind., Donald L. Esmay, Minneapolis, Minn., and Philip Hill, Lansing, Ill., assignors to Standard Oil Company, Chicago, Ill., a corporation of Indiana No Drawing. Application March 30, 1956
Serial No. 574,973

14 Claims. (Cl. 260—94.9)

This invention relates to novel catalysts and processes in which said catalysts are used for the polymerization of ethylene to produce high molecular weight polymers, specifically, resinous polyethylenes softening only at temperatures well above 100° C., being further characterized by relatively unbranched linear structure and high specific gravities ($d$ 24/4° C.) substantially above 0.95 g./cc.

One object of our invention is to provide novel and highly useful catalysts for the preparation of high molecular weight polymers from ethylene-containing gas mixtures. Another object is to provide such catalysts which do not induce alkylation of aromatic hydrocarbons, employed as a reaction medium, by ethylene under the polymerization conditions. A further object is to provide novel processes for the preparation of the aforesaid novel polymerization catalysts. One more object is to provide processes for the employment of the aforesaid catalysts to convert feed stocks comprising essentially ethylene to produce resinous polymers of predominantly linear structure, great stiffness and tensile strength, high crystallinity and density, and low permeability to moisture and/or other vapors and gases. An additional object is to provide a process for the conversion of ethylene to resinous polymers under moderate conditions of temperature and pressure in the presence of novel catalysts. These and other objects of our invention will become apparent from the following description thereof.

We have discovered that novel catalysts which are especially suitable for ethylene polymerization can be prepared by heating mixtures consisting essentially of active carbon and an alkaline earth metal hydride in defined ratios at high activation temperatures in an inert (non-oxidizing, non-hydrolyzing) atmosphere, that is to say, in an inert gas or high vacuum. Hydrogen, in low concentrations, is in equilibrium with the alkaline earth metal hydrides under the conditions of catalyst preparation but is considered an inert atmosphere for our purposes. The catalyst components are preferably powdered to a size below about 200 mesh per inch and are stirred mechanically or by an inert gas to effect intimate contacting. In general, suitable activation temperatures in the step of catalyst preparation are about 500° C. to about 700° C. when the preparation iss conducted at atmospheric pressure under a blanket of inert gas. When sub-atmospheric pressure is used, the temperature may be lowered considerably and may be as low as about 400° C. The preferred maximum activation temperature for $CaH_2$ is about 650° C., but for $BaH_2$ it is about 700° C. Contacting is continued for a period of time sufficient to obtain an active polymerization catalyst; in general, longer times are required at lower temperatures under otherwise constant operating conditions. We have used contacting periods in the range of 1 to 20 hours for catalyst preparation. Suitable inert gases are helium, neon, argon or the like, nitrogen, etc. Partial pressures of the order of 760 mm. of mercury down to $10^{-3}$ mm. of mercury or even less may be imposed over the ingredients being contacted to form the polymerization catalyst.

A wide variety of active carbons or "activated" carbons are available commercially and can be used for the purposes of this invention. A particularly suitable form of active carbon is obtained by the activation of charcoal derived from cellulosic materials, having a surface area between about 700 and about 1200 square meters per gram, a pore volume of about 0.53 to about 0.58 cc. per gram and a pore diameter of about 20 to 30 A. Very desirable results have been obtained by us through the use of activated coconut charcoal in the reaction with an alkaline earth metal hydride to prepare polymerization catalysts in accordance with this invention.

The alkaline earth metal hydrides are the hydrides of Be, Mg, Ca, Sr and Ba (non-radioactive metals of Group 2a of the Mendeleef Periodic Table). They can be used alone or as mixtures for the preparation of our polymerization catalyst.

In the preparation of the polymerization catalyst we employ between about 0.1 and about 15 gram atomic weights of active carbon per gram mol of alkaline earth metal hydride.

Metal oxides which are substantially irreducible under the conditions of catalyst preparation can be charged to the catalyst preparation step, particularly as powdered solids, to serve as desirable supporting and extending surfaces for the catalyst, permitting substantially higher polymer yields to be obtained in the polymerization of ethylene than would otherwise be the case. Thus, gamma-alumina (alumina gels, in general), silica gel, natural or synthetic alumino-silicates, or alumina-silica composites, which are well known in the art as catalyst supports, can be employed as ingredients of our novel catalysts. Other substantially irreducible metal oxides such as those of titanium and zirconium do not furnish as much surface as the aforesaid catalyst supports, although they serve to increase the mechanical strength of the catalyst composite, especially when the catalyst powder is pelleted therewith for use in polymerization. The proportion of supporting metal oxide can be varied between about 0.1 and about 20 times the weight of the active carbon employed in the catalyst.

It will be understood that the essential ingredients of our novel catalysts are the active carbon and alkaline earth metal hydride and that no additional ingredients are required to prepare a catalyst suitable for the polymerization of ethylene to resinous, relatively crystalline, relatively unbranched polymers.

The catalysts of our invention can be employed in various forms and sizes, e.g. as a powder, granules, lumps, etc. The catalyst powder can be shaped into pellets by suitable techniques in an inert atmosphere. We have found that the catalyst can be readily employed as granules having a size greater than about 200 mesh per inch, for example, between about 20 to 100 mesh per inch, in the polymerization of ethylene in the presence of an inert liquid medium. Powdered catalysts are likewise desirable for use in processes for the polymerization of ethylene in the gas phase with a motionalized bed, e.g. a stirred bed, a moving bed or a fluidized bed, all these techniques of contacting powdered solid with gas streams in ethylene polymerization being well known.

It is desirable to minimize or avoid the introduction of oxygen, carbon monoxide, carbon dioxide, water, acetylene, ammonia or sulfur compounds into contact with the catalysts of our invention before or during contact of ethylene therewith in the polymerization process.

The feed stock to our polymerization process comprises essentially ethylene and may consist of ethylene containing only trace amounts of impurities. However, the ethylene charging stock may contain ethane, propane and the like, which function as diluents but not as catalyst poisons. The feed stock may also contain propylene or other olefins such as 1-butene, tert-butylethylene, 1,3-butadiene, isoprene, styrene or the like.

Polymerization of ethylene is effected by contacting it with the aforesaid catalysts under suitable polymerization conditions, for example, at temperatures between about 100° C. and about 300° C., although we generally use the range of about 125 to 200° C., preferably about 130° C. to about 170° C. The ethylene partial pressures can range upward from about 15 p.s.i. to about 15,000 p.s.i. or even higher pressures. The polymerization process of our invention can be readily effected at a desirable rate at moderate ethylene pressures of the order of about 300 to 5000 p.s.i., usually at about 1000 p.s.i. Moderate temperatures in the range of about 100 to about 250° C. or more, particularly about 125 to about 200° C., can be used to good advantage with moderate pressures in the range of about 500 to about 2000 p.s.i. of ethylene.

Ethylene can be polymerized in the gas phase and in the absence of a liquid reaction medium by contact with our novel catalysts. Upon completion of the desired polymerization reaction, the catalyst containing the accumulated solid polymers is treated to recover these polymers, for example, by extraction with suitable solvents. However, in order to obtain increased rates of ethylene polymerization and to effect continuous removal of at least a fraction of the ethylene polymers from the catalyst during the polymerization, it is desirable to effect the polymerization in the presence of inert liquid reaction media, particularly saturated and/or aromatic hydrocarbons which are liquid under the polymerization conditions. Suitable alkanes and cycloalkanes useful as reaction media are n-pentane, isopentane, hexanes, heptanes, n-octane, isooctane, n-decane, n-dodecane, cyclohexane, methylcyclohexane, saturated naphthas, kerosenes or their mixtures, or the like. Suitable aromatic hydrocarbon liquid media comprise benzene, toluene, xylenes, mesitylene, or their mixtures, or the like. Other liquid hydrocarbon media which are substantially inert in the reaction zone may be employed. Since these are well known in the art of polymerizing ethylene in the presence of solid catalysts, there is no need to extend the description thereof herein (note, for example, U.S.P. 2,731,452 of Edmund Field and Morris Feller, granted January 17, 1956).

The liquid hydrocarbon reaction medium may be present in the polymerization reaction zone in proportions between about 10 and about 98% by weight, based on the weight of both ethylene and reaction medium. The concentration of ethylene in the liquid reaction medium is preferably between about 2 and about 5% by weight.

The concentration of catalyst with respect to ethylene can range upwardly from about 1 percent by weight and is usually of the order of about 10 to about 25 percent by weight in a batch operation in which the catalyst is suspended in a liquid hydrocarbon reaction medium and intimate contacting of ethylene and the catalyst is achieved by suitable agitation.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of ethylene solution in the liquid reaction medium.

In batch operations, operating periods of between one-half and about 40 hours, usually between about 2 and about 20 hours, are employed and the reaction autoclave is recharged with ethylene intermittently or continuously as the pressure decreases because of ethylene polymerization.

The solvent:catalyst weight ratio can be varied in the range of about 5 to about 3000, or even higher for flow systems.

The process of the present invention can be carried out using various techniques already known in the polymerization of ethylene with solid catalysts. Thus, the catalyst may be employed as a fluidized bed, a fixed bed, a moving bed or a slurry in the liquid reaction medium. As aforesaid, vapor phase polymerization of ethylene may be practiced with the present catalyst but, preferably, the ethylene is introduced as a gas into a reactor containing a substantially inert liquid hydrocarbon reaction medium or, in some instances, as a solution in said liquid hydrocarbon reaction medium.

The following examples are offered in order to provide specific illustrations of our invention without the intention of unduly limiting the same.

A small, stainless steel vessel equipped with a gas inlet and outlet and a stirrer was used for the preparation of the catalysts. The alkaline earth metal hydride was in each case ball-milled to a particle size sufficiently small to pass through a 200 mesh per inch screen. An activated coconut charcoal (Burrell) was used and was likewise ball-milled to below 200 mesh per inch. The alumina gel (gamma-alumina) used in some of the examples was prepared from an aluminum amalgam according to U.S.P. 2,274,634 (Reissue 22,196) and was a powder passing through a 200 mesh per inch screen. The powdered components which were used in the preparation of the catalyst were heated at 600° C. for 2 hours in a helium atmosphere at atmospheric pressure. The resultant powder was allowed to cool to room temperature, then transferred under an inert gas blanket to a stainless steel batch reactor equipped with a magnetic stirrer (250 ml. Magne-Dash reactor) containing 100 ml. purified, dried benzene. The contents of the reactor were stirred and heated to 150° C., ethylene was then introduced to a partial pressure of 1000 p.s.i. and polymerization was carried out for 18 hours with intermittent introduction of ethylene to maintain the reaction pressure. After the reaction, the reactor contents were allowed to cool to room temperature and excess gas pressure was vented. The catalyst containing sorbed polymer was filtered from the benzene reaction medium and extracted with xylene, the reaction medium was combined with the xylene extract, and the solute polymer was precipitated by the addition of methanol. The solvent was filtered from the polymer, redistilled and the distillate was analyzed by mass spectrometer, which showed that no benzene alkylation had occurred during the polymerization process. The results shown in Table 1 were obtained.

Table 1

| Example | Metal Hydride, g. | | Carbon, g. | Al$_2$O$_3$, g. | Yield of Polymer, g. | Properties of Polymer | |
|---|---|---|---|---|---|---|---|
| | | | | | | d 24/4° C. | Melt Viscosity,[3] Poises |
| 1 | CaH$_2$ | 2.5 | 2.0 | 0 | 2.0 | | |
| 2 | CaH$_2$ | 5.0 | 4.0 | 0 | 3.5 | 0.9686 | 3.1×10$^6$ |
| 3 | CaH$_2$ | 2.5 | 2.0 | 1.7 | 6.8 | 0.9692 | 3.5×10$^7$ |
| 4 | CaH$_2$ | 5.0 | 4.0 | 3.4 | 13.5 | 0.9685 | 2.5×10$^6$ |
| 5 | BaH$_2$ | 10.0 | 4.0 | 3.4 | 3.2 | 0.9695 | 3.0×10$^7$ |
| 6[1] | SrH$_2$ | 10.0 | 4.0 | 3.4 | 10.3 | 0.9669 | 2.7×10$^6$ |
| 7 | CaH$_2$ | 5.0 | 4.0 | [2] 2.0 | 6.0 | 0.9676 | 1.9×10$^6$ |

[1] 3-hour reaction period.
[2] SiO$_2$ gel in lieu of Al$_2$O$_3$.
[3] Determined by method of Dienes and Klemm, J. Applied Phys. 17, 458–71 (1946) at 145° C.

It is believed that the facts and data set forth in Table 1 are self-explanatory. However, the following comments are offered as a guide. It will be noted from Examples 1 and 2 that the sole ingredients required in the preparation of an active catalyst for the polymerization of ethylene are an alkaline earth metal hydride and active carbon. Further, a tendency towards increased yield of polymer with increasing concentration of active carbon (obviously within limits, since active carbon alone is not a catalyst for ethylene polymerization) is discernible from a comparison of Examples 1 and 2. Example 3 illustrates the fact that extension of the active catalyst components on a high surface area support increases the availability of the catalyst surface and, consequently, the yield of solid polyethylene in a given time. Doubling the catalyst concentration (Example 4) approximately doubled the yield of solid polyethylene.

Examples 5 and 6 illustrate the activity of supported catalysts derived from barium-carbon and strontium hydride-carbon. Example 7 shows the use of a silica support as an alternative for activated alumina.

A proposed polymerization catalyst was prepared by heating 3.4 g. of powdered gamma-alumina, 5.0 g. CaH$_2$ and 0.7 g. activated coconut charcoal at 710° C. for 2 hours in a helium atmosphere. The resultant powder was placed in a stirring autoclave with 100 ml. dry benzene and was heated and stirred under 1000 p.s.i.g. ethylene for 18 hours. This reaction yielded only 0.05 g. of solid polyethylenes, indicating that the catalyst components had been heated to a temperature which was somewhat too high for the most favorable activity.

EXAMPLE 8

The catalyst was prepared from 5 g. calcium hydride, 4 g. activated coconut charcoal, and 3.4 g. activated alumina by heating at 430° C. for 4 hours and maintaining a pressure of 1×10$^{-3}$ mm. of mercury by pumping. Using the same polymerization technique described in the above examples but a reaction period of only 2 hours, it was found that 11 g. of solid polyethylenes having a melt visocity of 1.6×10$^6$ poises and density (24/4° C.) of 0.9665 were obtained.

The examples in Table 2 illustrate the effect on the yield of polyethylene caused by varying the ratio of gram atoms of carbon per gram mol of calcium hydride in alumina-supported catalysts. The catalysts employed in the examples of Table 2 were prepared in a helium atmosphere at 600° C. and 2 hours, employing in each instance 3.4 g. of activated alumina gel, 5 g. calcium hydride and the weight of activated coconut charcoal indicated in the table. The catalyst components were all ball-milled to reduce the particle size below 200 mesh per inch before use in the catalyst preparation. The polymerizations were conducted as before in a Magne-Dash reactor of 250 ml. capacity, using 100 ml. of purified, dried benzene as the reaction medium, the temperature of 150° C., reaction period of 18 hours and partial pressures of ethylene which varied between about 600 and 1000 p.s.i.

Table 2

| Example | Charcoal (Burrell), g. | Gram Atoms C/Gram mol CaH$_2$ | Yield of Polymer, g. | Polymer Properties | |
|---|---|---|---|---|---|
| | | | | d/24 | Melt Viscosity |
| 9 | 0 | 0 | 0 | | |
| 10 | 0.25 | 0.175 | 0.27 | | |
| 11 | 0.50 | 0.350 | 0.95 | 0.9655 | 1.8×10$^6$ |
| 12 | 0.80 | 0.56 | 1.27 | 0.9666 | 2.6×10$^6$ |
| 13 | 2.0 | 1.40 | 5.7 | 0.9647 | 2×10$^6$ |
| 14 | 4.0 | 1.40 | 8.0 | 0.9652 | 1×10$^6$ |
| 15 | 4.0 | 2.80 | 9.7 | 0.9632 | 2.8×10$^6$ |
| 16 | 6.0 | 4.20 | 12.6 | 0.9630 | 3.2×10$^6$ |
| 17 | 8.0 | 5.55 | 16.2 | | |
| 18[1] | 6.0 | 17.3 | 0.1 | | |

[1] 0.9 g. alumina gel and 1.25 g. calcium hydride were used with carbon.

EXAMPLE 19

A catalyst was prepared by heating finely-powdered BaH$_2$ (11 g.), coconut charcoal (4 g.) and activated alumina (3.4 g.) for 2 hours at 710° C. in helium at atmospheric pressure. The resultant catalyst was cooled and transferred under a blanket of inert gas to a Magne-Dash reactor (250 cc. capacity), to which 100 ml. of dried benzene were added. The reactor contents were stirred for 18 hours at 150° C. under an ethylene pressure of about 1000 p.s.i.g., resulting in a pressure drop of 150 p.s.i. The catalyst was extracted with hot xylene and 3.2 g. of solid polyethylenes were recovered thereby.

The polymers of the present invention can be used or treated as the polymers whose preparation is described in U.S. Patent 2,691,647.

Having described our invention, we claim:

1. A process for the preparation of a catalyst suitable for the polymerization of ethylene to form resinous polymers, which process comprises the step of heating a mixture consisting essentially of active charcoal and an alkaline earth metal hydride in an inert atmosphere in a ratio between about 0.1 and about 15 gram atoms of said carbon per mol of said alkaline earth metal hydride to an activation temperature selected within the range of about 400° C. and about 700° C. for at least about 2 hours.

2. The process of claim 1 wherein said alkaline earth metal hydride is calcium hydride and said activation temperature is within the range of 500° C. to 650° C. in an inert atmosphere and within the range of 400° C. to 650° C. under vacuum.

3. The process of claim 1 wherein said alkaline earth metal hydride is barium hydride and said activation temperature is between about 500° C. and about 700° C.

4. The process of claim 1 wherein said alkaline earth metal hydride is strontium hydride.

5. The process of claim 1 wherein a substantially unreducible metal oxide selected from the group consisting of alumina and silica is added to said mixture.

6. A catalytic composition active for the polymerization of ethylene to form resinous polymers prepared by the process of claim 1.

7. A catalytic composition active for the polymerization of ethylene to form resinous polymers prepared by the process of claim 2.

8. A catalytic composition active for the polymerization of ethylene to form resinous polymers prepared by the process of claim 3.

9. A catalytic composition active for the polymerization of ethylene to form resinous polymers prepared by the process of claim 4.

10. A catalytic composition active for the polymerization of ethylene to form resinous polymers prepared by the process of claim 5.

11. A catalytic composition active for the polymerization of ethylene to form resinous polymers prepared by heating a mixture consisting essentially of an activated coconut charcoal, an alkaline earth metal hydride and an active alumina in a ratio of about 0.1 to about 15 gram atoms of active carbon per gram mol of said alkaline earth metal hydride and a weight ratio of said alumina to said carbon between about 0.1 and about 20, and effecting said heating in an inert atmosphere to a temperature between about 500° C. and about 650° C. for at least about 2 hours.

12. A process for the polymerization of ethylene to form a high molecular weight polymer which softens only at temperatures in excess of 100° C., which process comprises contacting ethylene under polymerization conditions with a catalyst prepared by heating a mixture consisting essentially of active charcoal and an alkaline earth metal hydride in an inert atmosphere in a ratio between about 0.1 and about 15 gram atoms of said carbon per gram mol of said alkaline earth metal hydride for at least about 2 hours at an activation temperature selected within the range of about 400° C. and about 700° C.

13. The process of claim 12 wherein said polymerization conditions comprise a temperature between about 130° C. and about 170° C.

14. The process which comprises contacting ethylene at a temperature between about 130° C. and about 170° C. with a catalytic composition active for the polymerization of ethylene to form resinous polymers prepared by heating a mixture consisting essentially of an activated coconut charcoal, an alkaline earth metal hydride and an active alumina in a ratio of about 0.1 to about 15 gram atoms of active carbon per gram mol of said alkaline earth metal hydride and a weight ratio of said alumina to said carbon between about 0.1 and about 20, and effecting said heating in an inert atmosphere to a temperature between about 500° C. and about 650° C. for at least about 2 hours.

References Cited in the file of this patent

UNITED STATES PATENTS

| | | |
|---|---|---|
| 1,500,794 | Bowvier | July 8, 1925 |
| 2,436,733 | Schneider | Feb. 24, 1948 |
| 2,725,374 | Mosher | Nov. 29, 1955 |
| 2,727,023 | Evering et al. | Dec. 13, 1955 |
| 2,727,024 | Field | Dec. 13, 1955 |
| 2,767,160 | Field et al. | Oct. 16, 1956 |